United States Patent
Marino (10) Patent No.: US 8,452,152 B2
(45) Date of Patent: May 28, 2013

(54) FIXED ATTENUATION AIR GAP INTERFACE FOR A MULTIMODE OPTICAL FIBER INTERCONNECTION

(75) Inventor: Mark Marino, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 303 days.

(21) Appl. No.: 12/825,948

(22) Filed: Jun. 29, 2010

(65) Prior Publication Data

US 2011/0317961 A1    Dec. 29, 2011

(51) Int. Cl.
*G02B 6/00*    (2006.01)

(52) U.S. Cl.
USPC .......................................................... 385/140

(58) Field of Classification Search
USPC ..................................... 385/140, 66
See application file for complete search history.

(56) References Cited

U.S. PATENT DOCUMENTS

| | | | | |
|---|---|---|---|---|
| 4,130,345 A | * | 12/1978 | Doellner | 385/44 |
| 4,384,203 A | * | 5/1983 | Wells | 250/227.21 |
| 4,540,237 A | * | 9/1985 | Winzer | 385/47 |
| 4,695,126 A | * | 9/1987 | Cook | 385/58 |
| 4,878,730 A | * | 11/1989 | Wall | 385/56 |
| 4,893,889 A | * | 1/1990 | Iwakiri et al. | 385/39 |
| 6,058,235 A | * | 5/2000 | Hiramatsu et al. | 385/135 |
| 6,102,581 A | * | 8/2000 | Deveau et al. | 385/56 |
| 6,311,010 B1 | * | 10/2001 | Medeiros | 385/140 |
| 7,891,883 B2 | * | 2/2011 | Zimmel et al. | 385/78 |
| 8,308,374 B2 | * | 11/2012 | Gurreri | 385/72 |
| 2003/0081282 A1 | * | 5/2003 | Yamakawa | 359/124 |
| 2011/0317961 A1 | * | 12/2011 | Marino | 385/58 |

* cited by examiner

*Primary Examiner* — Charlie Peng
(74) *Attorney, Agent, or Firm* — Harrity & Harrity, LLP (57) ABSTRACT

A fiber-to-fiber connector system that includes a first connector for housing a portion of a first fiber, where the first fiber is terminated by a first end-face. The fiber-to-fiber connection system also includes a second connector for housing a portion of a second fiber, where the second fiber is terminated by a second end-face, where the first connector and the second connector permit the first fiber and the second fiber to be interconnected to form an air gap interface between the first end-face and the second end-face; the air gap interface defines a spacing between the first end-face and the second end-face; and the air gap interface enables, based on the defined spacing, an optical signal to be transmitted between the first fiber and the second fiber with a fixed quantity of attenuation.

23 Claims, 8 Drawing Sheets

FIXED ATTENUATION AIR GAP INTERFACE FOR A MULTIMODE OPTICAL FIBER INTERCONNECTION

BACKGROUND

Multimode optical fibers are usually interconnected with optical network devices and/or other multimode optical fibers via a fiber-to-port (e.g., a port associated with an optical network device) connector and/or a fiber-to-fiber connector, respectively. When a multimode optical fiber is interconnected, via a connector, to another multimode optical fiber and/or port, an interface is established that permits an optical signal to traverse the interface in a manner that minimizes loss of power in the optical signal (e.g., below a certain threshold).

Fiber-to-fiber and/or fiber-to-port connectors usually create the interface by establishing physical contact between the end-faces of each optical fiber to be connected. Attenuation film is usually included on a prepared (e.g., optically polished) end-face, associated with one or both optical fibers to be connected, that creates a surface via which the physical contact is established and which controls and/or limits the amount of loss associated with an optical signal traversing the interface.

Unfortunately, the physical contact associated with the interface imparts a force and/or pressure on the end-face of each optical fiber, which may damage an end-face and/or the attenuation film. Additionally, the physical pressure may cause impurities and/or contamination (e.g., dust, ferrule material, damaged attenuation film, and/or other contaminants), present on an end-face when the optical fibers are connected, to further damage the end-face and/or to introduce light scattering mechanisms that increase the loss associated with the interface (e.g., above the threshold). The increased loss reduces the power in the optical signal traversing the interface, which can cause a loss of data and/or a disruption of service associated with an optical network with which the interface is associated.

SUMMARY

According to one aspect, a fiber-to-fiber connector system may include a first connector for housing a portion of a first fiber, where the first fiber is terminated by a first end-face. The fiber-to-fiber connector system may also include a second connector for housing a portion of a second fiber, where the second fiber is terminated by a second end-face, where the first connector and the second connector may permit the first fiber and the second fiber to be interconnected to form an air gap interface between the first end-face and the second end-face; the air gap interface may define a spacing between the first end-face and the second end-face; and the air gap interface may enable, based on the defined spacing, an optical signal to be transmitted between the first fiber and the second fiber with a fixed quantity of attenuation . . .

According to another aspect, an optical connection may include a first connector for housing a portion of a first fiber, where the first fiber is terminated by a first end-face. The optical connection may also include a second connector for housing a portion of a second fiber, where the second fiber may be terminated by a second end-face and where the first connector and the second connector may permit the first fiber and the second fiber to be interconnected to form an air gap interface between the first end-face and the second end-face; the air gap interface may define a spacing and an end-face angle between the first end-face and the second end-face; and the air gap interface may enable, based on the defined spacing and the defined end-face angle, an optical signal to be transmitted between the first fiber and the second fiber with a fixed quantity of attenuation.

According to yet another aspect, a method may be performed by a server device. The method may include receiving a request to create an air gap interface via which two fibers are interconnected in a manner that permits an optical signal to traverse the air gap interface. The request may include a particular spacing, associated with the air gap interface, where a first fiber is terminated by a first end-face and a second fiber is terminated by a second end-face; the air gap interface defines the particular spacing between the first end-face and the second end-face; and the air gap interface enables, based on the particular spacing, an optical signal to be transmitted between the first fiber and the second fiber with a fixed quantity of attenuation. The method may also include determining a particular end-face angle and performing an operation on the first end-face or the second end-face to establish the particular end-face angle, where the particular end-face angle enables the particular spacing between the first end-face and the second end-face to be established.

DETAILED DESCRIPTION

The following detailed description refers to the accompanying drawings. The same reference numbers in different drawings may identify the same or similar elements. Also, the following detailed description does not limit the invention.

An implementation described herein may include systems and/or methods that provide for a fixed attenuation air gap interface (hereinafter referred to as "air gap interface") for a multimode optical fiber. The air gap interface may eliminate an attenuation film associated with a fiber-to-fiber and/or a fiber-to-port mechanical interface (hereinafter referred to as "interface"), and may reduce or eliminate damage to a multimode fiber end-face caused by the mechanical interface. The air gap interface may also reduce the loss associated with the damage to the multimode fiber end-face.

For example, the mechanical interface, which is created by physical contact between multimode fibers contained in the interface, may be replaced with another fiber-to-fiber connection and/or optical connection, such as an air gap interface that includes an air gap and/or spacing between the multimode fibers. The air gap interface may, for example, eliminate the force and/or pressure imparted on the end-faces (e.g., in order to establish the physical contact associated with the mechanical interface), which may reduce and/or eliminate end-face damage and/or attenuation film damage. In another example, the air gap interface may eliminate other end-face damage mechanisms and/or light scattering mechanisms (e.g., caused by dents, grooves, ridges, bumps, attenuation film delaminations, etc., on the surface of and/or embedded within a polished end-face) by the eliminating the force and/or pressure imparted on impurities and/or contaminants (e.g., dust, ferrule material, damaged attenuation film, and/or other contaminants) that may be present on an end-face when the interface is established. In yet another example, the air gap and/or spacing between end-faces, associated with an air gap interface, may provide a particular quantity of attenuation and/or loss that may correspond to a quantity of attenuation and/or loss introduced by the attenuation film. In this example, the air gap and/or spacing (e.g., associated with an air gap interface) may be specified to introduce the particular quantity of attenuation and/or loss, which may enable the attenuation film to be eliminated from the air gap interface.

In one example implementation, a set up operation to prepare an end-face for an air gap interface may be performed. For example, an air gap interface application (hereinafter referred to as an "interface application") may perform an operation that enables a network designer to specify parameters and/or a desired optical signal attenuation (e.g., loss) associated with an air gap interface. In another example implementation, the interface application may use the parameters to perform an operation to prepare a fiber end-face in a manner that establishes a spacing in accordance with the parameters associated with the air gap interface.

By eliminating the physical contact between multimode fibers, associated with a mechanical interface, damage to end-faces of multimode fibers contained in an interface may be reduced and/or eliminated. The air gap interface may, for example, extend the life of connectors and/or the quantity of connects/disconnects before replacement is required. In another example, by eliminating the attenuation film, associated with the mechanical interface, the cost associated with connectors and/or end-face preparation may be reduced and a potential source of impurities and/or contamination may be eliminated, which may extend the life of the connector. In yet another example, by reducing damage to end-faces, power loss associated with an optical signal traversing the air gap interface may be reduced (e.g., below a threshold), which may reduce or eliminate data loss or disruption of service.

Exemplary System Overview

Figure 1A:
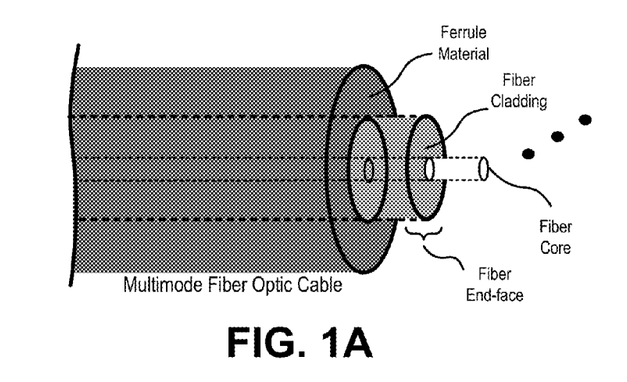
FIGS. 1A and 1B are diagrams of an overview of a fixed attenuation air gap interface for a multimode optical fiber implementation described herein.
Figure 1B:
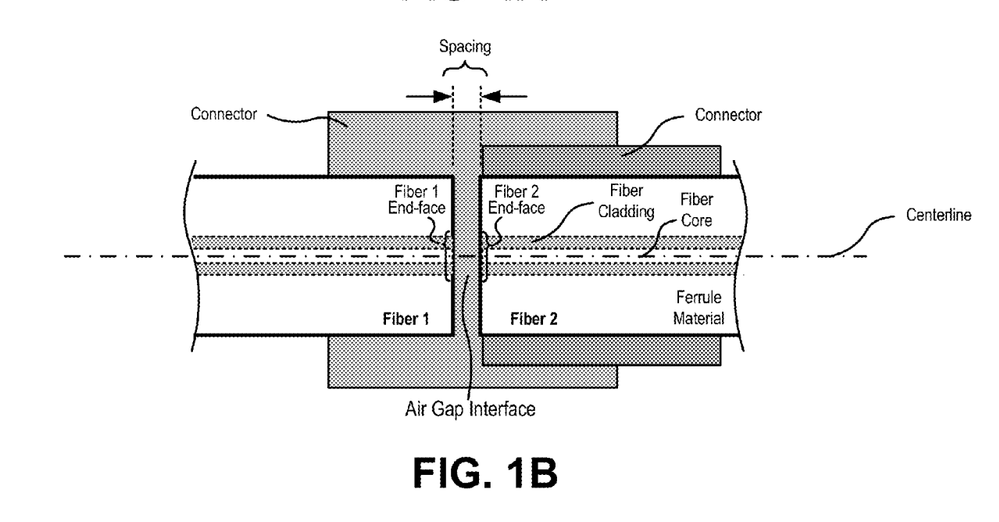

FIGS. 1A and 1B are diagrams of an overview of a fixed attenuation air gap interface for a multimode optical fiber implementation described herein. As shown in FIG. 1A, a multimode fiber optic cable may include a ferrule material, a fiber cladding, a fiber core, and/or a fiber end-face. The ferrule material may provide a medium (e.g., plastic, ceramic, metal, and/or other materials) in which the fiber (e.g., fiber cladding and/or fiber core) and/or other fibers are installed and/or packaged (e.g. in the fiber optic cable, a connector, a port, etc.). The fiber cladding may include a material (e.g., usually a form of optically opaque plastic) that encircles and/or encompasses the fiber core. The fiber cladding may protect the fiber core from damage (e.g., due to mechanical, chemical, environmental, and/or other damage mechanisms) and/or may shield the fiber core from optical and/or electromagnetic interference from sources located outside the fiber core. The fiber core may be a multimode fiber core that includes optical fiber material (e.g., usually plastic, glass, and/or combinations thereof) that enables multimode optical signals (e.g., optical signals that may include more than one propagation mode and/or multiple frequencies) to be transmitted to and/or from devices within an optical network. The fiber end-face may include an end of the fiber (e.g., the fiber core, the fiber cladding and/or the fiber core and the fiber cladding) with which an air gap interface may be established (e.g., with another multimode fiber end-face and/or port).

Unless specifically stated otherwise, the terms, "fiber," "optical fiber," "fiber optic cable," and/or "port," as described herein, shall be interpreted to mean a multimode fiber and/or a fiber, an optical fiber, a fiber optic cable, and/or a port that is cable of transporting a multimode optical signal.

As shown in FIG. 1B, an air gap interface may be provided between two fibers. For example, as illustrated in FIG. 1B, two fibers (e.g., fiber 1 and fiber 2) may be positioned on a centerline that runs axially through a center (e.g., a center point) of the fiber core of each fiber. The position of the fibers on the centerline may be done in a manner that permits the end-face of fiber 1 to be axially aligned with the end-face of fiber 2 The fibers may, for example, be further positioned in a manner that a particular spacing is established between the fiber 1 end-face and the fiber 2 end-face (e.g., as measured from the center point of the fiber core of fiber 1 to the center point of the fiber core of fiber 2) that may establish a fiber-to-fiber connection and/or optical connection (e.g., an air gap interface). As described further below, the particular spacing may correspond to a particular quantity of loss. Generally, for example, as the spacing increases, the loss associated with an optical signal, traversing the air gap interface, may increase. In another example, as the spacing decreases, the loss associated with the optical signal may decrease. Therefore, a network designer may, for example, desire that an air gap interface be used to replace a mechanical interface (e.g., by adjusting the spacing associated with an air gap interface in a manner that creates loss that is approximately equal to the loss associated with a mechanical interface). In another example, the network designer may desire to tailor the spacing, and/or the corresponding loss associated with an air gap interface, for other purposes.

Additionally, or alternatively, a connector, (e.g., a subscriber connection SC connector, a fixed connection (FC) connector, a straight tip (ST) connector, etc.) may be used to aid in the positioning of the fibers (e.g., the axial alignment and/or the particular spacing of the fiber end-faces), to maintain and/or protect the air gap interface, and/or to prevent contaminants and/or impurities from compromising the interface (e.g., by inducing additional loss, above some threshold, and/or causing damage to one or both end-faces). For example, a connector may be used to establish an air gap interface where a portion of the connector (e.g., a male or female portion) may house a portion of a multimode fiber optic cable (e.g., coinciding with an end-face termination) that may be connected to another portion of the connector (e.g., a female or male portion) that houses a portion of another multimode fiber optic cable (e.g., coinciding with another end-face portion). In another example, a connector may be used to establish an air gap interface between the multimode fiber optic cable and a port associated with an optical device (e.g., an interface port, a loopback test device, a Y-cable, a switch interface board (SIB), etc.) that transmits and/or receives multimode optical signals to and/or from the multimode fiber optic cable.

While FIG. 1B illustrates an air gap spacing that includes fiber end-faces that are parallel relative to each other and/or perpendicular to the centerline, in another implementation, the end-faces (e.g., the fiber 1 end-face and the fiber 2 end-face) may not be parallel to each other and/or may not be perpendicular to the centerline. In one example, an angle associated with an end-face (hereinafter referred to as a "fiber end-face angle") may be set and/or adjusted to cause the spacing (e.g., and/or a corresponding loss), associated with an air gap interface, to change.

An interface application may be used to prepare a fiber end-face to be used in an air gap interface. For example, the interface application may receive, from a network designer, parameters associated with an air gap interface (e.g., a desired quantity of attenuation and/or loss, a fiber end-face angle, a spacing dimension, etc.) and may use the parameters to determine the manner in which a particular fiber end-face may be prepared and/or configured. The interface application may store information associated with particular fiber end-face characteristics obtained as a result of the set up operation.

An operation to prepare a fiber end-face may be performed by the interface application. For example, the interface application may receive a request to perform an end-face preparation operation associated with particular fiber end-face characteristics and may retrieve information associated with the particular fiber end-face characteristics. The interface application may, for example, send the fiber end-face characteristics to an end-face preparation device that may perform the end-face preparation operation. The end-face preparation device may machine the particular fiber end-face (e.g., by cutting, grinding, polishing, treating, etc.) to prepare the fiber end-face in accordance with the fiber end-face characteristics. The prepared fiber end-face may enable the network designer to create an air gap interface in accordance with the air gap parameters specified during the set up operation.

Exemplary System Overview

Figure 2:
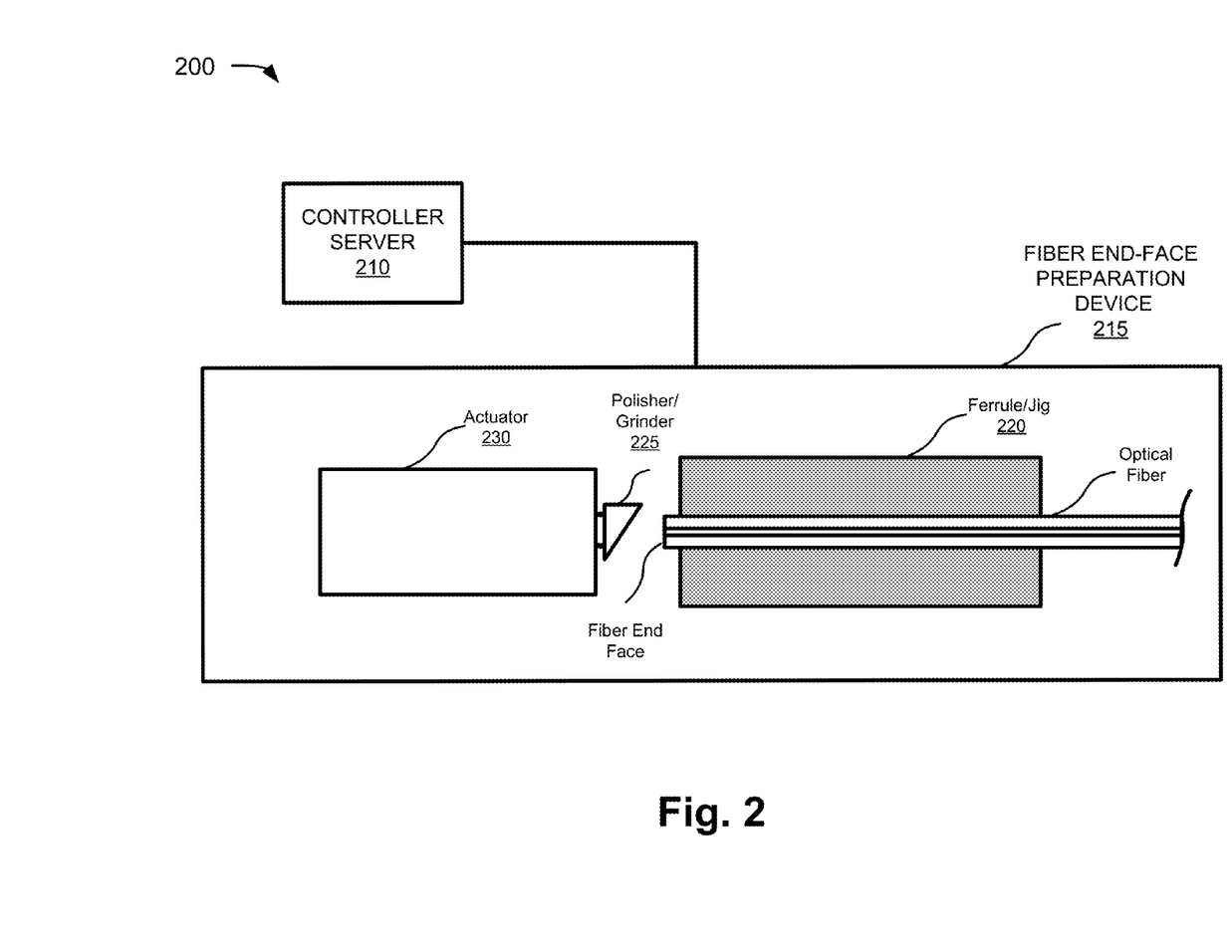
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include a controller server 210 and/or a fiber end-face preparation device 215 (hereinafter referred to as a "preparation device 215"). The number of devices, illustrated in FIG. 2, is provided for explanatory purposes only. In practice, there may be additional devices, fewer devices, different devices, or differently arranged devices than illustrated in FIG. 2. Also, in some implementations, one or more of the devices of network 200 may perform one or more functions described as being performed by another one or more of the devices of network 200. For example, controller server 210 and/or preparation device 215 may be integrated into a single device. Devices of network 200 may interconnect via wired connections, wireless connections, or a combination of wired and wireless connections.

Controller server 210 may include one or more server devices, or other types of computation or communication devices, that gather, process, search, store, and/or provide information in a manner similar to that described herein. For example, controller server 210 may host an interface application that may be used to perform a set up operation to prepare a fiber end-face. In another example, the interface application may use the information obtained from the set up operation and may instruct preparation device 215 to prepare a fiber end-face in accordance with parameters received from a network designer and/or computed, by the interface application, during the set up operation.

Preparation device 215 may include a ferrule/jig component 220, a polisher/grinder component 225, and/or an actuator component 230. The number of components, of preparation device 215, is provided for explanatory purposes only. In practice, there may be additional components, fewer components, different components, or differently arranged components than are shown in preparation device 215. Also, in some implementations, one or more of the components of preparation device 215 may perform one or more functions described as being performed by another one or more of the components of preparation device 215.

Ferrule/jig component 220 may include a material (e.g., such as plastic, ceramic, metal, and/or other material) that is configured to hold a fiber in a fixed position during which an end-face preparation operation is being performed. Polisher/grinder component 225 may, for example, include a surface and/or component that can hold and/or use a material suitable for machining, grinding, polishing, treating, etc. (e.g., such as polishing tape, grinding tape, a grinding bit, a polishing compound, a buffing material, etc.) a fiber end-face (e.g., a fiber end-face held in a fixed position by ferrule/jig component 220). In another example, polisher/grinder component 215 may include a device that may vibrate, rotate, orbit, spin, and/or move in a manner that, when in contact with a fiber end-face, causes the fiber end-face to be ground, polished, shaped, angled, and/or otherwise configured for use in an air gap interface. Actuator component 230 may include a processor, a microprocessor, an application-specific integrated circuit (ASIC), a field programmable gate array (FPGA), or another type of processing unit that may interpret and/or execute instructions received from controller server 210. For example, actuator component 230 may receive instructions from controller server 210, which may cause polisher/grinder device 225 to begin preparing an end-face in a manner described above. In another example, actuator component 230 may receive instructions from controller server 210 that may cause actuator 230 and/or grinding/polishing component 225 to move in a manner that places grinding/polishing component 225 into contact with a fiber end-face (e.g., held in a fixed position by ferrule/jig component 220) in order to perform the end-face preparation operation.

Figure 3:
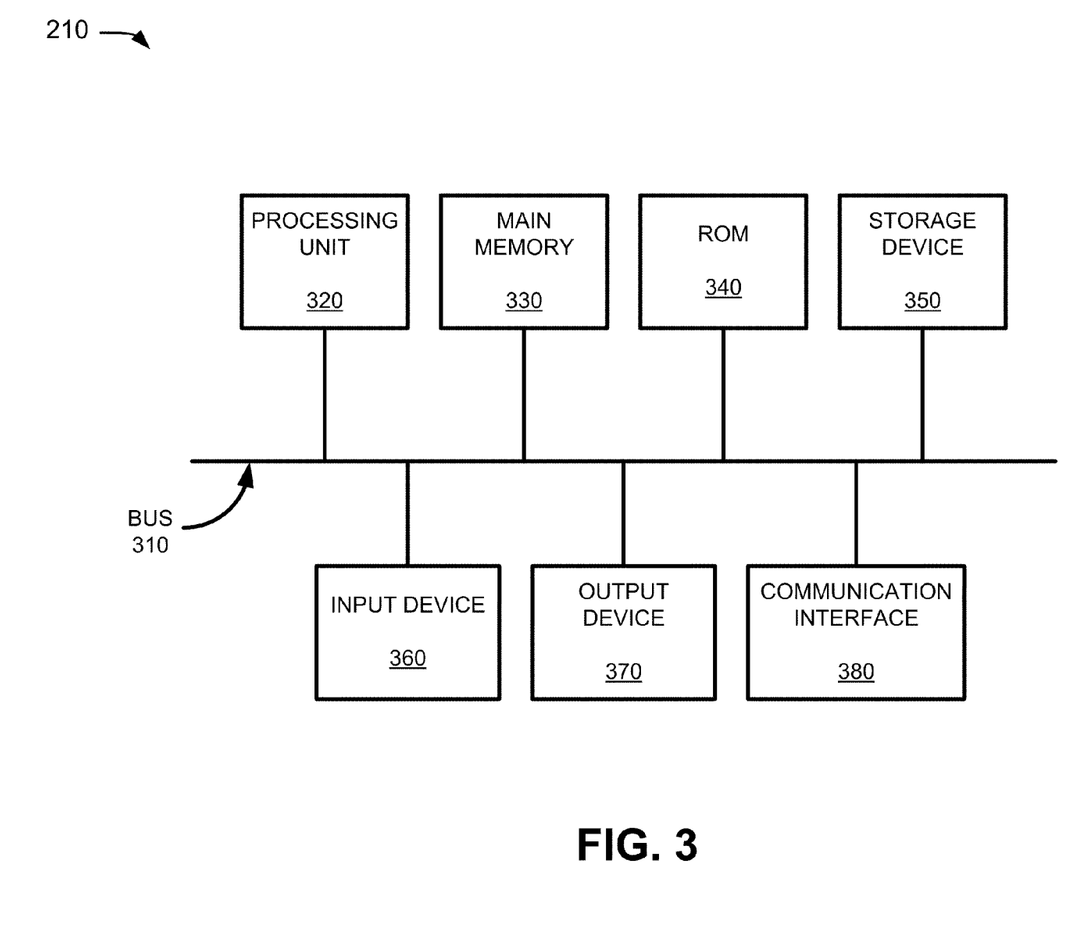
FIG. 3 is a diagram of example components of one or more of the devices of FIG. 2.

FIG. 3 is a diagram of exemplary components of controller server 210. As illustrated, controller server 210 may include a bus 310, a processing unit 320, a main memory 330, a read-only memory (ROM) 340, a storage device 350, an input device 360, an output device 370, and/or a communication interface 380. Bus 310 may include a path that permits communication among the components of controller server 210.

Processing unit 320 may include a processor, a microprocessor, an ASIC, an FPGA, or another type of processing unit that may interpret and execute instructions. Main memory 330 may include a random access memory (RAM) or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive, or a type of flash memory.

Input device 360 may include a mechanism that permits a user to input information into controller server 210, such as a keyboard, a mouse, a pen, a button, voice recognition and/or biometric mechanisms, a touch screen, etc. Output device 370 may include a mechanism that outputs information to the user, such as a display, a speaker, a light emitting diode (LED), etc. Communication interface 380 may include any transceiver-like mechanism that enables controller server 210 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications.

As described herein, controller server 210 may perform certain operations in response to processing unit 320 executing software instructions contained in a computer-readable medium, such as main memory 330. A computer-readable medium may be defined as a physical or logical memory device. A logical memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of controller server 210, in other implementations, controller server 210 may contain fewer components, additional components, different components, or differently arranged components than depicted in FIG. 3. Additionally, or alternatively, in other implementations, one or more components of controller server 210 may perform one or more tasks described as being performed by one or more other components of controller server 210.

Exemplary Air Gap Interface Configuration

Figure 4:
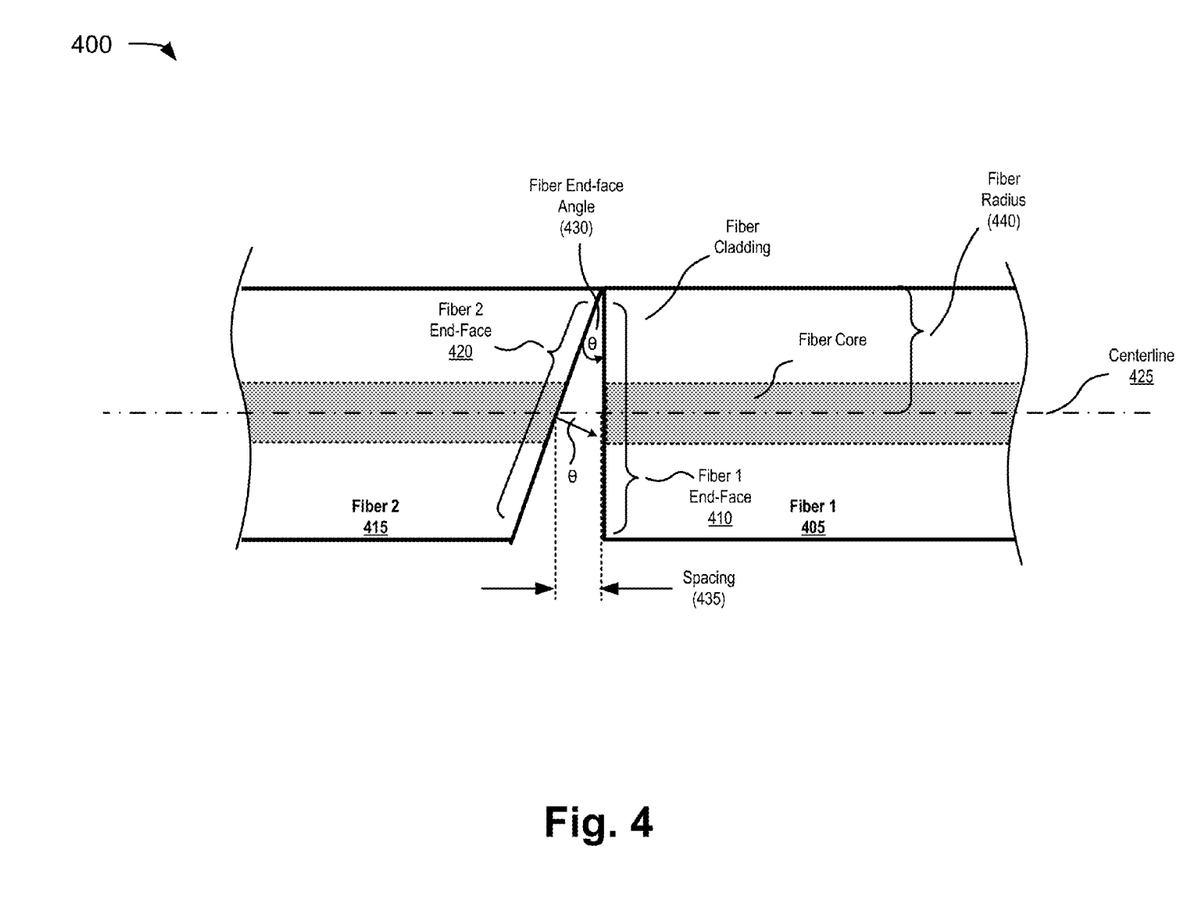
FIG. 4 is a diagram of an example fixed attenuation air gap interface associated with a multimode fiber interconnection.

FIG. 4 is a diagram of an example air gap interface 400 (hereinafter referred to as interface 400) associated with a fiber interconnection. For example, as illustrated in FIG. 4, interface 400 may include a first fiber 405 that is axially aligned with a second fiber 415, relative to a centerline 425, in a manner similar to that described above with respect to FIG. 1B. Fiber 405 may, for example, include a fiber end-face 410 that is perpendicular to centerline 425. In another example, fiber 415 may include a fiber end-face 420 that is oriented at a particular angle (e.g., a fiber end-face angle 430, shown as "θ") relative to centerline 425. Interface 400 may include a spacing dimension (e.g., spacing 435) as a measure from the center point of the fiber core of fiber 405 to the center point of the fiber core of fiber 415. First fiber 405 and/or second fiber 415 may include a connector housing (not shown in FIG. 4) in a manner similar to that described above (e.g., with respect to FIG. 1B).

Parameters associated with air gap interface 400 may be specified to establish a particular spacing, fiber end-face angle, and/or attenuation/loss associated air gap interface 400. Assume, for example, that a network designer desires to create a fiber-to-fiber/optical connection, using an air gap interface, to replace a mechanical interface (e.g., as described above) that includes a particular attenuation and/or loss (e.g., sometimes referred to herein as an attenuation factor) due to the attenuation film, end-face damage, impurities, and/or other factors. For example, a network designer may, during a set up operation to prepare an end-face, specify parameters associated with interface 400 in order to establish an air gap spacing (e.g. spacing 435) that yields an attenuation that is approximately equal to the particular attenuation and/or loss associated with the mechanical interface. In this example, the network designer may specify a fiber radius (e.g., fiber radius 440) and/or a particular fiber type (e.g., from which physical parameters, such as a fiber radius, may be obtained by the interface application). Additionally, the network engineer may specify a spacing dimension (e.g., spacing 435) and the interface application may use the fiber radius and/or the spacing dimension to determine a fiber end-face angle (e.g., fiber end-face angle 430) associated with a fiber end-face (e.g., fiber end-face 420) with which to perform an end-face preparation operation (e.g., by machining, grinding, polishing, treating, etc.). In one example, the interface application may determine angle 430 based on a trigonometric calculation, such as, for example, (e.g., $\theta \cong \sin^{-1}(\text{spacing/fiber radius})$).

In another example, the network designer may specify a desired attenuation factor (e.g., a quantity of signal power loss associated with an optical signal that traverses an air gap interface) associated with interface 400. The interface application may perform a look up operation, using the attenuation factor, to obtain information associated with a particular spacing dimension that corresponds with a quantity of loss that is approximately equal to the attenuation factor. The interface application may use the information associated with the spacing dimension to determine the fiber end-face angle (e.g., fiber end-face angle 430) in a manner similar to that described above.

Exemplary Processes

Figure 5:
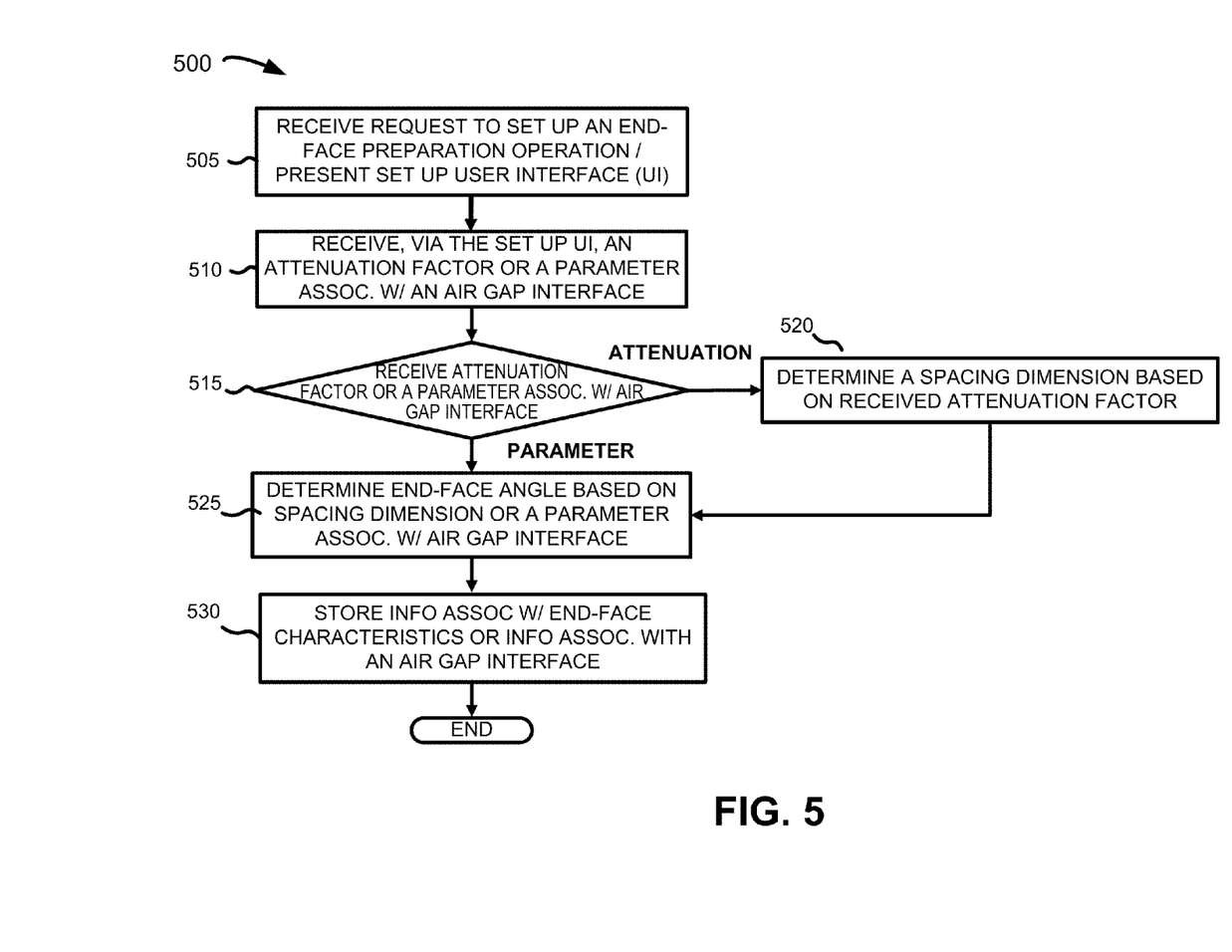
FIG. 5 is a flowchart of an example process for setting up a multimode fiber end-face preparation operation.
Figure 6:
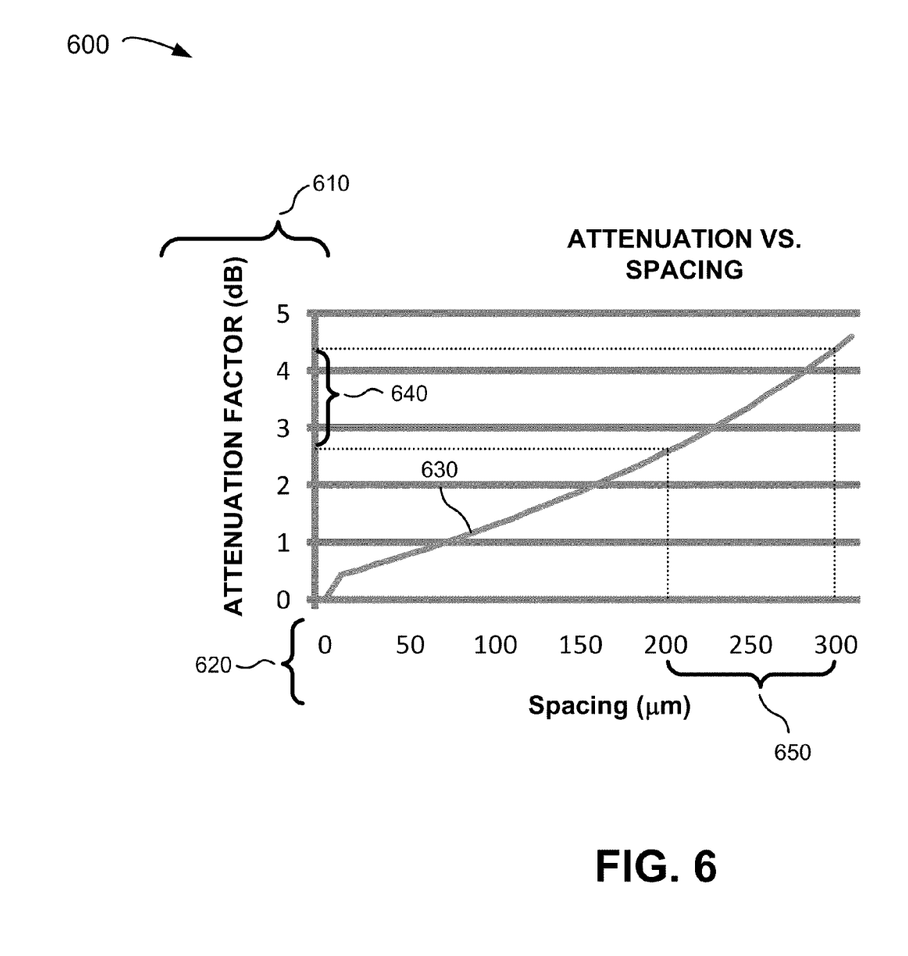
FIG. 6 is a diagram of an example attenuation-spacing graph for use in determining parameters associated with a fixed attenuation air gap interface.

FIG. 5 is a flowchart of an example process 500 for setting up a fiber end-face preparation operation. In one implementation, process 500 may be performed by controller server device 210. In another implementation, some or all of process 500 may be performed by a device or collection of devices separate from, or in combination with, controller server 210. FIG. 6 is a diagram of an example attenuation-spacing graph 600 for use in determining parameters associated with a fixed attenuation air gap interface. A portion of process 500, of FIG. 5, will be discussed below with corresponding references to example attenuation-spacing graph 600 shown in FIG. 6.

As shown in FIG. 5, process 500 may include receiving a request to set up an end-face preparation operation and a set up user interface (UI) may be presented (block 505). For example, controller server 210 may receive a request from a network designer (e.g., associated with controller server 210) to set up an end-face preparation operation for a fiber, or a set of fibers, associated with an air gap interface. The interface application may, in response to the request, retrieve information associated with a set up UI and may present the information associated with the set up UI on a display associated with controller server 210.

As also shown in FIG. 5, process 500 may include receiving, via the set up UI, an attenuation factor or a parameter associated with an air gap interface (block 510). For example, the network designer may enter, via the set up UI, a parameter associated with an air gap interface and/or a desired attenuation factor associated with the air gap interface. Controller server 210 may receive, via the set up UI, the attenuation factor and/or the parameter associated with the air gap interface (e.g., fiber end-face angle 430, spacing 435, fiber radius 440, etc.), such as those described above with respect to FIG. 4.

As shown in FIG. 5, if an attenuation factor associated with an air gap interface is received (block 515—ATTENUATION), then process 500 may include determining a spacing dimension based on the received attenuation factor (block 520). For example, the interface application may determine that an attenuation factor has been received by controller server 210 and may retrieve (e.g., from a memory associated with controller server 210) an attenuation-spacing graph (e.g., attenuation-spacing graph 600 of FIG. 6) to determine a spacing dimension, associated with an air gap interface, that corresponds to the received attenuation factor.

As illustrated in FIG. 6, attenuation-spacing graph 600 may include a collection of data items, such as an attenuation factor (decibel, dB) scale 610, a spacing (micrometer, μm) scale 620, an attenuation-spacing curve 630, an example attenuation film specification range 640, and/or an example equivalent spacing range 650. While FIG. 6 illustrates certain data items of attenuation-spacing graph 600, in another implementation, attenuation-spacing graph 600 may include fewer data items, additional data items, different data items, or differently arranged data items than depicted in FIG. 6.

Attenuation factor (dB) scale 610 may include a scale that may be used to identify a quantity of attenuation associated with an air gap interface. Spacing (μm) scale 620 may include a spacing dimension associated with an air gap interface similar to that described above (e.g., with respect to spacing 435 of FIG. 4). Attenuation-spacing curve 630 may indicate a quantity of attenuation associated with an air gap interface (e.g., identified on attenuation factor (dB) scale 610) as a function of a particular spacing (e.g., identified on spacing (μm) scale 620) associated with the air gap interface. Assume, for example, that a network designer wishes to design an air gap interface that provides approximately the same amount of attenuation as a mechanical interface that includes attenuation film as described above. For example, the interface application may receive an attenuation factor that is approximately equal to attenuation film specification range 640 (e.g., attenuation factor "α") of 3.5 dB±1.0 dB (e.g., 2.5 dB≦α≦4.5 dB). As illustrated in FIG. 6, the interface application may determine that attenuation film specification range 640 may correspond to an equivalent spacing range 650 (e.g., S) of 250 μm±50 μm (e.g., 200 μm≦S≦300 um).

Returning to FIG. 5, if a parameter associated with an air gap interface is received (block 515—PARAMETER or after block 520), then process 500 may include determining a fiber end-face angle based on information associated with a spacing dimension or a parameter associated with an air gap interface (block 525). For example, the interface application may determine that a fiber end-face angle is received, via the set up UI, and may use the fiber end-face angle to prepare an end-face for the particular fiber. In another example, the interface application may determine that a parameter, associated with an air gap interface (e.g., a spacing dimension and/or a radius associated with a fiber), is received via the set up UI and/or as a result of an operation to determine a spacing dimension based on an attenuation factor as described above. In this example, the interface application may use the spacing dimension and/or the fiber radius (e.g., fiber radius "r") to determine a fiber end-face angle (e.g., fiber end-face angle 430 of FIG. 4) associated with an air gap interface. The interface application may, for example, compute the fiber end-face angle (e.g., θ) using a trigonometric algorithm (e.g., θ≅sin$^{-1}$(spacing/fiber radius)). Using the trigonometric algorithm, the interface application, in one example, may determine a fiber end-face angle (e.g., θ) of 5.74 degrees for a particular fiber radius (e.g., r≅50 μm) and/or a spacing of 250 μm (e.g., received via the set up UI and/or obtained from attenuation-spacing graph 600) based on the trigonometric function (e.g., θ≅sin$^{-1}$(0.025 m/0.250m)=5.74 degrees). In another implementation, other fiber end-face angles may be computed using an algorithm that is different than the trigonometric algorithm described above.

As further shown in FIG. 5, process 500 may include storing information associated with end face characteristics or information associated with the air gap interface (block 530). For example, the interface application may store, in a memory associated with controller server 210, information associated with end face characteristics (e.g., information associated with a fiber end-face angle) for use during an end-face preparation operation on a fiber to be used in an air gap interface. In another example, the interface application may store a parameter associated with the air gap interface and/or an attenuation factor received via the set up UI.

Figure 7:
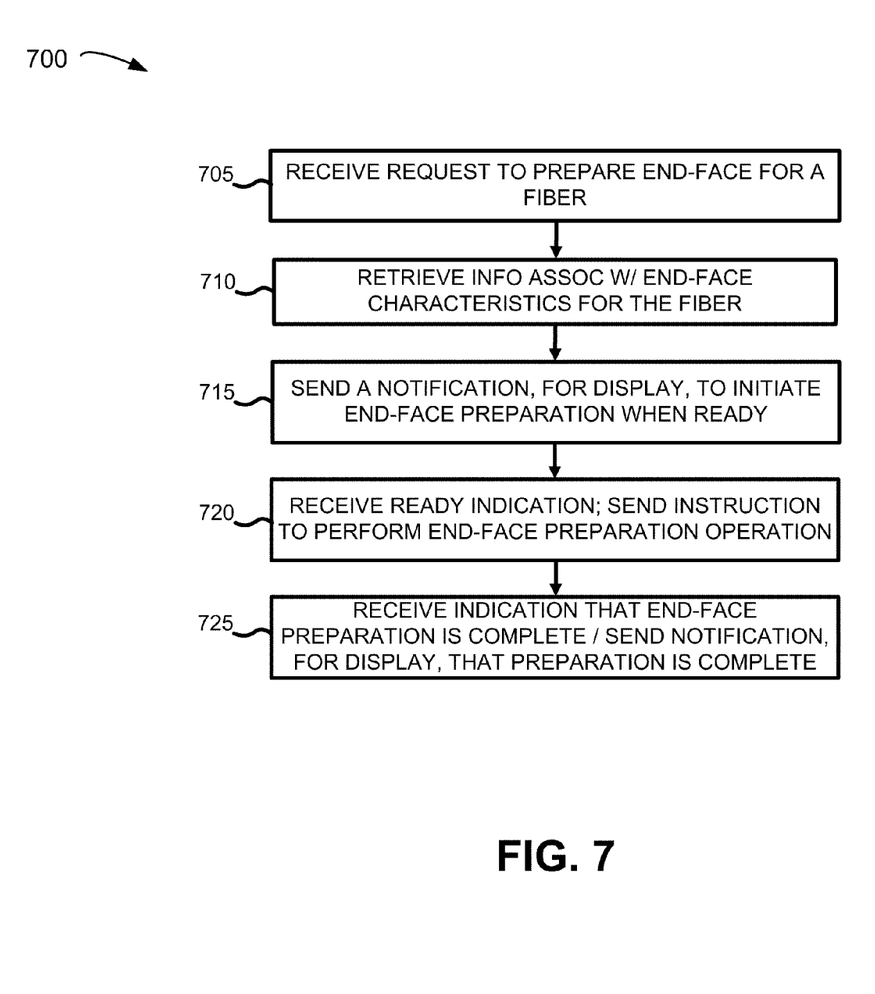
FIG. 7 is a diagram of example process for preparing a multimode fiber end-face.

FIG. 7 is a diagram of an example process 700 for preparing a fiber end-face. In one implementation, process 700 may be performed by controller server 210. In another implementation, some or all of process 700 may be performed by a device or collection of devices separate from, or in combination with, controller server 210.

As shown in FIG. 7, process 700 may include receiving a request to prepare a fiber end-face. For example, controller server 210 may receive a request (e.g., from a network designer associated with controller server 210) to prepare an end-face associated with a particular fiber to be included in an air gap interface.

As also shown in FIG. 7, process 700 may include retrieving information associated with end-face characteristics for the fiber (block 710). For example, the interface application may, in response to the request, retrieve information associated with end-face characteristics for the particular fiber. The information associated with the end-face characteristics may include a fiber end-face angle to be machined (e.g., treated, grinded, and/or polished) into the particular fiber via the end-face preparation operation.

As further shown in FIG. 7, process 700 may include sending a notification, for display, to initiate an end-face preparation operation when ready (block 715). For example, the interface application may send a notification, for display on a display associated with controller server 210, instructing the network designer to initiate the end-face preparation operation when ready.

As yet further shown in FIG. 7, process 700 may include receiving a ready indication and sending an instruction to perform the end-face preparation operation (block 720). For example, the network designer may verify that the particular fiber is properly inserted in preparation device 215 (e.g., in ferrule/gig component 220 of FIG. 2) and may send an ready indication to controller server 210 (e.g., by pressing a particular button on a keyboard/keypad, a touch screen, clicking a button via a UI, etc. associated with controller server 210). Controller server 210 may receive the ready indication and may send an instruction to end-face preparation device 215 to initiate an end-face preparation operation. The instruction may include the end-face characteristics associated with the particular fiber (e.g., the fiber end-face angle), parameters associated with an air gap interface (e.g., a spacing dimension, physical dimensions, such as a radius, associated with the particular fiber, etc.), and/or other information (e.g., a type of fiber from which physical dimensions, etc. may be obtained).

As still further shown in FIG. 7, process 700 may include receiving an indication that the end-face preparation operation is complete and sending a notification, for display, that the end-face operation is complete (block 725). For example, preparation device 215 may receive the instruction to perform the end-face preparation operation and may, in response to the instruction, initiate an end-face preparation operation. In this example, preparation device 215 may machine an end-face associated with the particular fiber (e.g., the particular fiber installed in ferrule component/jib 220 of FIG. 2) in a manner that causes the end-face to be oriented at an angle (e.g., fiber end-face angle 445 of FIG. 4) relative to a centerline that runs axially through the fiber core of the particular fiber. The machining performed by the preparation device 215 may further include grinding and/or optically polishing the end face associated with the particular fiber. When the end-face preparation operation is completed, preparation device 215 may send an indication to controller server 210 indicating that the end-face preparation operation is completed. Controller server 210 may receive the indication and may send a notification, for display (e.g., on a display device associated with controller server 210), notifying the network designer that the end-face preparation operation is complete and that the fiber may be removed from preparation device 210.

The network designer may, for example, remove the particular fiber from preparation device 215 and may insert the particular fiber into a connector (e.g., a connector as described above in connection with FIG. 1B). Additionally, or alternatively, the network designer may create the air gap interface by connecting the particular fiber to another fiber that includes an end-face that is parallel to the centerline that runs axially through the center of the fiber core. The resulting air gap interface may include a fiber end-face angle (e.g., fiber end-face angle 430) and/or a spacing dimension (e.g., spacing 435) as described above with respect to FIG. 4 and/or may yield an attenuation factor that corresponds to the spacing dimension as described above (e.g., with respect to FIG. 6).

Other Exemplary Air Gap Interface Configurations

Figure 8A:
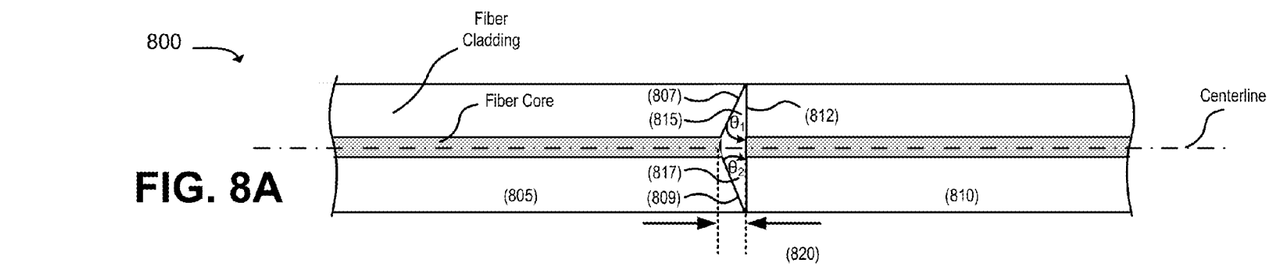
FIGS. 8A-8C are diagrams of other example fixed attenuation air gap interfaces.
Figure 8B:
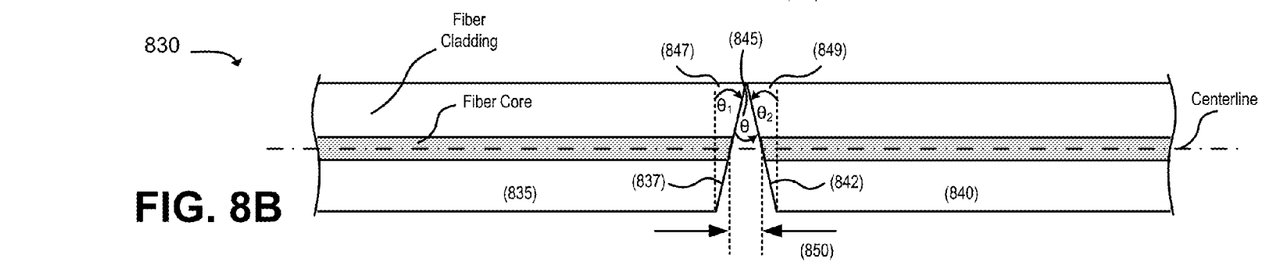
Figure 8C:
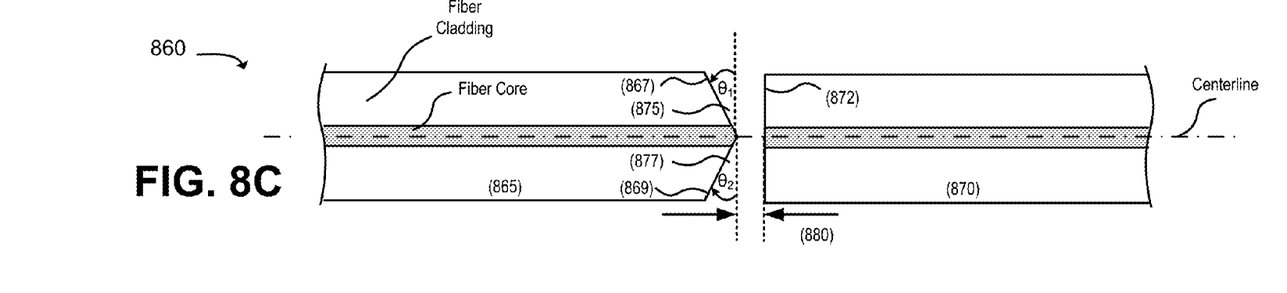

FIGS. 8A-8C are diagrams of other example air gap interfaces 800, 830, and 860, respectively. Air gap interface 800 of FIG. 8A (hereinafter referred to as "interface 800"), air gap interface 830 of FIG. 8B (hereinafter referred to as "interface 830"), and/or air gap interface 860 of FIG. 8C (hereinafter referred to as "interface 860") may include all or a portion of the components and/or elements as described above in connection with FIG. 4 and/or FIGS. 1A-B. For example, interfaces 800, 830, and 860 may each include a connector housing, fibers that contain a fiber cladding and/or a fiber core, and/or may include fibers that are axially aligned (e.g., through a center point of the core fiber) via a centerline in a manner similar to that described above (e.g., with respect to FIG. 4). Air gap interfaces 800, 830, and 860 are provided for explanatory purposes only, and other implementations may include air gap interfaces that are different than the air gap interfaces depicted in FIGS. 8A-8C.

As illustrated in FIG. 8A, interface 800 may include a first fiber 805 and a second fiber 810 that are axially positioned on a centerline with a particular spacing 820. For example, fiber 805 may include an end-face 807 associated with a fiber end-face angle 815 (e.g., shown as $\theta_1$) and/or an end-face 809 associated with a fiber end-face angle 817 (e.g., shown as $\theta_2$). Fiber end-face angles 815 and/or 817 may be specified (e.g., in a manner similar to that described in FIG. 5) by a network designer and/or computed by the interface application (e.g., based on received air gap interface parameters) in a manner similar to that described above (e.g., with respect to FIG. 5), to establish spacing 820 and/or attenuation associated interface 800. In another example, an air gap interface could be specified where fiber end-face angle 815 is specified in a manner that is constant for a complete revolution (e.g., "360" degrees) about the centerline (e.g., creating a conically concave end-face centered at the center point of the core fiber).

As illustrated in FIG. 8B, interface 830 may include a first fiber 835 and/or a second fiber 840 that are axially positioned on a centerline with a particular spacing 850. For example, fiber 835 may include an end-face 837 associated with a fiber end-face angle 847 (e.g., shown as $\theta_1$). Fiber 840 may include an end-face 842 associated with a fiber end-face angle 849 (e.g., shown as $\theta_2$). In another example, an air gap angle 845 (e.g., shown as $\theta$) may be approximately equal to the sum of fiber end-face angles 847 and 849 (e.g., $\theta \cong \theta_1 + \theta_2$). Air gap angle 845, fiber end-face angle 847, and/or fiber end-face angle 849 may be specified by a network designer and/or computed by the interface application (e.g., based on received air gap interface parameters) in a manner similar to that described above (e.g., with respect to FIG. 5), to establish a desired spacing 850 and/or attenuation associated interface 830.

As illustrated in FIG. 8C, interface 860 may include a first fiber 865 and/or a second fiber 870 that are axially positioned on a centerline with a particular spacing 880. For example, fiber 865 may include a co-planar and/or multi-planar end-face surface that includes an end-face 867 associated with a fiber end-face angle 875 (e.g., shown as $\theta_1$) and/or an end-face 869 associated with a fiber end-face angle 877 (e.g., shown as $\theta_2$). Fiber 870 may include an end-face 872 that is perpendicular to the centerline. Fiber end-face angles 875 and/or 877 may be specified by a network designer and/or computed by the interface application (e.g., based on received air gap interface parameters) in a manner similar to that described above (e.g., with respect to FIG. 5), to establish a desired spacing 880 and/or attenuation associated interface 860.

In another example, another air gap interface could include a fiber end-face angle that is specified in a manner that is constant for a complete revolution (e.g., "360" degrees) about the centerline (e.g., creating a conically convex end-face centered at the center point of the core fiber).

Conclusion

An implementation described herein may include systems and/or methods that provide for a fixed attenuation air gap interface for a multimode optical fiber interconnection using a technique that may eliminate attenuation film used in a mechanical interface and/or may reduce the likelihood of damage to fiber end-faces caused by a force imparted on a fiber associated with a mechanical interface. Additionally, or alternatively, the air gap interface may reduce loss associated with fiber interconnections by reducing the likelihood of damage due to the force and/or other end-face damage caused by impurities (e.g., from attenuation film, ferrule material, etc.) associated with the mechanical interface. Additionally, or alternatively, the air gap interface may extend the life of fiber interconnections and/or optical fiber devices by eliminating the attenuation film, eliminating damaging mechanisms, and/or reducing the loss associated with the mechanical interface.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIGS. 5 and 7, the order of the blocks may be modified in other embodiments. Further, non-dependent blocks may be performed in parallel.

It will be apparent that aspects, as described herein, may be implemented in many different forms of software, firmware, and hardware in the aspects illustrated in the figures. The actual software code or specialized control hardware used to implement aspects described herein is not limiting of the invention. Thus, the operation and behavior of the embodiments were described without reference to the specific software code—it being understood that software and control hardware may be designed to implement the aspects based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server device, a request to create an air gap interface via which at least two fibers are interconnected in a manner that permits an optical signal to traverse the air gap interface,
   a first fiber, of the at least two fibers, being terminated by a first end-face,
   a second fiber, of the at least two fibers, being terminated by a second end-face, and
   the request including information regarding a first quantity of attenuation that occurs when a mechanical interface that is being replaced by the air gap interface is used;
   determining, by the server device, a spacing dimension of a particular spacing of the air gap interface based on the information regarding the first quantity of attenuation;
   determining, by the server device and based on the request, a particular end-face angle based on the spacing dimension; and
   performing, by the server device, an operation on the first end-face or the second end-face to establish the particular end-face angle,
   the particular end-face angle enabling the particular spacing between the first end-face and the second end-face to be established.

2. The method of claim 1, where the particular spacing between the first end-face and the second end-face does not include physical contact between the first end-face and the second end-face.

3. The method of claim 1, where determining the particular end-face angle includes:
   computing the particular end-face angle by using a trigonometric function that is based on a radius, associated with the first fiber or the second fiber, and the spacing dimension.

4. The method of claim 1, where the air gap interface enables, due to the particular spacing, the optical signal to be transmitted between the first fiber and the second fiber with a second quantity of attenuation that is approximately equal to the first quantity of attenuation.

5. The method of claim 1,
   where the first fiber is associated with a multimode fiber optic cable, and
   where the second fiber corresponds to a port associated with a multimode test loopback test device that receives a multimode optical signal from the multimode fiber optic cable or transmits the multimode optical signal to the multimode optical signal.

6. The method of claim 1, further comprising:
   providing, for display, a notification requesting a user to initiate the operation, and
   receiving a ready indication before performing the operation on the first end face or the second end face.

7. The method of claim 6, where the ready indication indicates that the first fiber or the second fiber is properly inserted into a component that holds the first fiber or the second fiber in a fixed position during the operation.

8. The method of claim 1, where performing the operation on the first end face or the second end face comprises:
   transmitting, to a preparation device, an instruction to initiate the operation.

9. The method of claim 8, where the instruction includes first information regarding the spacing dimension and second information regarding the particular end-face angle.

10. The method of claim 8, further comprising:
    receiving, from the preparation device, an indication that the operation is complete, and
    providing, for display, a notification that indicates that the operation is complete.

11. A system comprising:
    one or more processors to:
    receive information regarding an air gap interface that is to be created between a first fiber and a second fiber in a manner that permits an optical signal to traverse the air gap interface,
    a first fiber being terminated by a first end-face,
    a second fiber being terminated by a second end-face, and
    the information regarding the air gap interface including information regarding a quantity of attenuation that occurs when a mechanical interface that is being replaced by the air gap interface is used;
    determine a spacing dimension of a spacing of the air gap interface based on the information regarding the quantity of attenuation;
    determine an end-face angle based on the spacing dimension; and
    initiate an operation on the first end-face or the second end-face to establish the end-face angle,
    the end-face angle enabling the spacing between the first end-face and the second end-face to be established.

12. The system of claim 11,
    where the first fiber is associated with a multimode fiber optic cable, and
    where the second fiber corresponds to a port, associated with an optical device, that receives a multimode optical signal from the multimode fiber optic cable.

13. The system of claim 11, where, when determining the end-face angle, the one or more processors are to:
    determine the end-face angle based on the spacing dimension and a radius of the first fiber or the second fiber.

14. The system of claim 11, where the spacing enables the air gap interface to be established between the first end-face and the second-end face without an attenuation film or a mechanical interface.

15. The system of claim 11, where at least one of the first end-surface or the second end-face includes a planar surface, a multi-planar surface, or a conical surface.

16. The system of claim 11, where the one or more processors are further to:
    determine that the operation is complete, and provide, for display, a notification that indicates that the operation is complete and that the first fiber or the second fiber is now removable from a component that holds the first fiber or the second fiber in a fixed position during the operation.

17. A non-transitory computer-readable medium storing instructions, the instructions comprising:
one or more instructions, that when executed by at least one processor, cause the at least one processor to:
receive a request regarding an air gap interface that is to be created between a first fiber and a second fiber in a manner that permits an optical signal to traverse the air gap interface,
a first fiber being terminated by a first end-face,
a second fiber being terminated by a second end-face, and
the request being associated with information regarding a quantity of attenuation that occurs when a mechanical interface that is being replaced by the air gap interface is used;
determine a spacing dimension of a spacing of the air gap interface based on the information regarding the quantity of attenuation;
determine an end-face angle based on the spacing dimension; and
initiate an operation on the first end-face or the second end-face to establish the end-face angle,
the end-face angle enabling the spacing between the first end-face and the second end-face to be established.

18. The non-transitory computer-readable medium of claim 17, where the one or more instructions to initiate the operation include:
one or more instructions, that when executed by the at least one processor, cause the at least one processor to:
provide, for display, a notification requesting a user to initiate the operation,
receive an indication that a particular device is ready for the operation, and
send, after receiving the indication and to the particular device, an instruction to initiate the operation.

19. The non-transitory computer-readable medium of claim 18,
where the indication indicates that the first fiber or the second fiber is properly inserted into a component, of the particular device, that holds the first fiber or the second fiber in a fixed position during the operation, and
where the instruction includes first information regarding the spacing dimension and second information regarding the end-face angle.

20. The non-transitory computer-readable medium of claim 17, where the one or more instructions to determine the end-face angle include:
one or more instructions, that when executed by the at least one processor, cause the at least one processor to:
compute the end-face angle by using a trigonometric function that is based on a radius, associated with the first fiber or the second fiber, and the spacing dimension.

21. The non-transitory computer-readable medium of claim 17, where the instructions further comprise:
one or more instructions, that when executed by the at least one processor, cause the at least one processor to:
receive, after initiating the operation and from a device that performs the operation, an indication that the operation is complete; and
provide, for display, a notification that indicates that the operation is complete and that the first fiber or the second fiber is now removable from a component, of the device, that holds the first fiber or the second fiber in a fixed position during the operation.

22. The non-transitory computer-readable medium of claim 17, where the spacing between the first end-face and the second end-face does not include physical contact between the first end-face and the second end-face.

23. The non-transitory computer-readable medium of claim 17, where the air gap interface enables, due to the spacing, the optical signal to be transmitted between the first fiber and the second fiber with a quantity of attenuation that is approximately equal to the quantity of attenuation that occurs when the mechanical interface is used.

* * * * *